(12) United States Patent
Yang et al.

(10) Patent No.: US 8,572,081 B1
(45) Date of Patent: *Oct. 29, 2013

(54) IDENTIFYING NON-COMPOSITIONAL COMPOUNDS

(75) Inventors: Stewart Yang, San Jose, CA (US); Fang Liu, Beijing (CN); Pei Cao, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,565

(22) Filed: Jan. 30, 2012

Related U.S. Application Data

(63) Continuation of application No. 12/403,328, filed on Mar. 12, 2009, now Pat. No. 8,108,391.

(51) Int. Cl.
*G06F 17/30* (2006.01)

(52) U.S. Cl.
USPC .......................................... 707/736; 707/749

(58) Field of Classification Search
USPC .............. 707/736, 749, 705, 741; 704/9, 2, 4
See application file for complete search history.

(56) References Cited

U.S. PATENT DOCUMENTS

| | | | |
|---|---|---|---|
| 6,098,034 A | 8/2000 | Razin et al. | |
| 7,366,654 B2 * | 4/2008 | Moore | 704/2 |
| 8,108,391 B1 * | 1/2012 | Yang et al. | 707/736 |
| 2010/0083103 A1 | 4/2010 | Paek et al. | |

* cited by examiner

*Primary Examiner* — Hung T Vy
(74) *Attorney, Agent, or Firm* — Fish & Richardson P.C.

(57) ABSTRACT

Methods, systems, and apparatus, including computer programs encoded on computer storage media, for identifying non-compositional compounds. In one aspect, a method includes the actions of receiving a collection of phrases, each phrase including two or more words; for each phrase, determining if the phrase is a non-compositional compound, a non-compositional compound being a phrase of two or more words where the words composing the phrase have different meanings in a compound than their conventional meanings individual, the determining including: identifying a similar term for a term of the phrase, substituting the similar term for the term of the phrase to generate a substitute phrase, calculating a similarity between the phrase and the substitute phrase, and identifying the phrase as a non-compositional compound when the calculated similarity is less than a specified threshold value.

19 Claims, 7 Drawing Sheets

IDENTIFYING NON-COMPOSITIONAL COMPOUNDS

CROSS-REFERENCE TO RELATED APPLICATIONS

This application is a continuation application of, and claims priority to, U.S. patent application Ser. No. 12/403,328, for Identifying Non-Compositional Compounds, which was filed on Mar. 12, 2009. The disclosure of the foregoing application is incorporated here by reference.

BACKGROUND

This specification relates to identifying non-compositional compounds.

A non-compositional compound ("NCC") is a phrase of two or more words where the words composing the phrase have different meanings in the compound than their conventional meanings. As a result, the meaning of an NCC cannot be derived from the meanings of the constituent words taken individually. For example, the phrases "red herring" and "hot dog" are example non-compositional compounds ("NCC's"), as the constituent words "red", "herring", "Hot", and "Dog" all have a different meaning in the compound than their conventional meanings. For example, "red herring" taken together can refer to something that distracts attention from the real issue. However, taken individually, the conventional meanings of "red" (color) and "herring" (fish) have no relation to "red hearing" (distraction). The phrases are not limited to two word phrases. The idiomatic phrase "kick the bucket" is an example three-word NCC.

By contrast, a compositional compound ("CC") is a phrase of two or more words where the words composing the phrase have the same meanings in the compound as their conventional meanings. For example, "old lady" is a compositional compound that retains the conventional meaning of the individual words in the phrase.

Additionally, a partial compositional compound ("PCC") is a phrase where at least one word of the phrase retains its conventional meaning in the compound. The phrase "baby spinach" is an example PCC.

Identifying phrases as NCC's is useful in information retrieval. For example, when searching for documents responsive to the query "hot dog," knowledge that the query phrase is an NCC can improve the results by discounting documents that only include "hot" or "dog" since they are likely unrelated to "hot dog".

SUMMARY

This specification describes technologies relating to identifying non-compositional compounds.

In general, one aspect of the subject matter described in this specification can be embodied in methods that include the actions of receiving a collection of phrases, each phrase including two or more words; for each phrase, determining if the phrase is a non-compositional compound, a non compositional compound being a phrase of two or more words where the words composing the phrase have different meanings in a compound than their conventional meanings individual, the determining including: identifying a similar term for a term of the phrase, substituting the similar term for the term of the phrase to generate a substitute phrase, calculating a similarity between the phrase and the substitute phrase, and identifying the phrase as a non-compositional compound when the calculated similarity is less than a specified threshold value. Other embodiments of this aspect include corresponding systems, apparatus, and computer program products.

These and other embodiments can optionally include one or more of the following features. Identifying similar words to a NCC word includes performing a similarity measure based on the context of a candidate word and the context of other words from a collection of text. Calculating similarity between candidate NCC and substitute phrase includes performing a similarity measure based on the context of the candidate NCC and the context of the substitute phrase from a collection of text. Receiving phrases includes receiving a collection of text; and extracting phrases from the collection of text. The similarity identifies a vertical similarity. The method further includes annotating phrases identified as non compositional compounds.

The method further includes receiving a search query; determining whether the search query includes a non-compositional compound; and modifying a search for resources responsive to the search query when the search query includes a non-compositional compound; and presenting search results responsive to the search query. The modifying includes searching for the non compositional compound and not constituent terms of the non-compositional phrase. The method further includes receiving a search query; determining whether the search query includes a non-compositional compound; using the non-compositional compound to identify one or more advertisements; and presenting search results responsive to the search query and the one or more advertisements.

Particular embodiments of the subject matter described in this specification can be implemented so as to realize one or more of the following advantages. A system can identify NCC's with a high level of accuracy (e.g., 90% in some implementations). The system can automatically identify NCC's from a collection of phrases without using a human annotated training set to train a classifier. Additionally, the system can be used to identify NCC's for various languages, particularly Roman character based languages.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
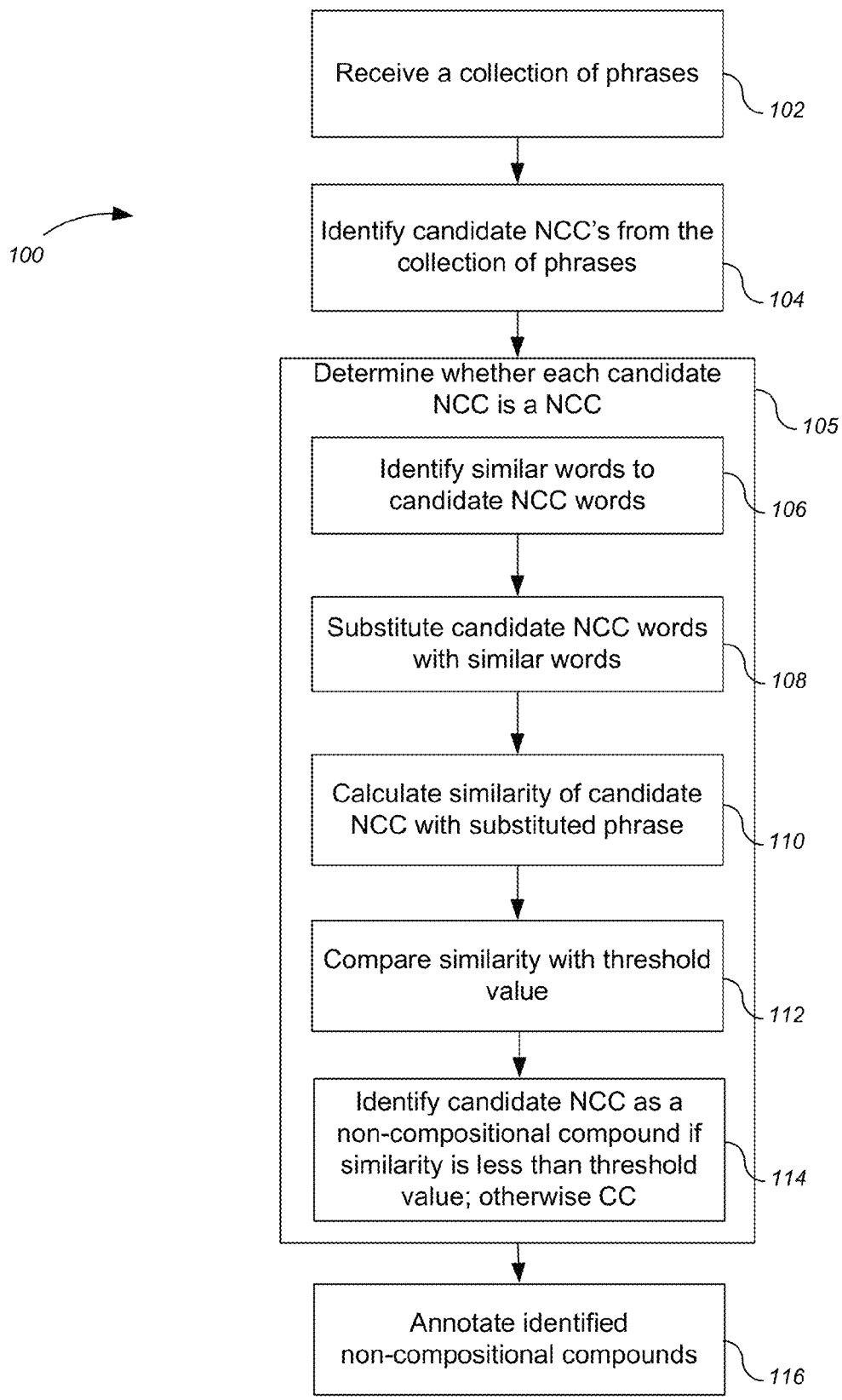
FIG. 1 is flowchart showing an example method for identifying non-compositional compounds from a collection of phrases.

FIG. 1 is flowchart showing an example method 100 for identifying non-compositional compounds from a collection of phrases. For convenience, the method 100 will be described with respect to a system that performs the method 100.

The system receives 102 a collection of phrases. A phrase is a group of one or more consecutive words (e.g., an n-gram) that carries a concrete and complete meaning and can function as a single syntactic unit in a sentence. Examples of one word phrases include "Chicago" or "book". Examples of two word phrases include "New York" or "computer science". Some phrases could be long, e.g., "President of the United States of America". Phrases can be extracted from text strings having one or more words. For example, a sentence or other text string can include one or more phrases.

The received collection of phrases can be obtained, for example, from a collection of text. Obtaining the collection of phrases can include performing a phrase extraction technique to the collection of text. Each phrase can be an n-gram sequence of words extracted from the collection of text. For example, phrases can be extracted from text strings in the collection of text including sentences of web documents and web queries. In some implementations, phrase extraction includes selecting popular n-grams from web queries and web documents, creating a feature vector for each candidate by computing their statistical and linguistic features, and then classifying each candidate as phrase or non-phrase by training a classifier to classify those feature vectors.

In some implementations, generating the collection of phrases includes filtering the collection of text to remove URL's, IP addresses, dates, symbols, and other non-phrases, e.g., advanced search operators. Additionally, long phrases can be removed or alternatively not included in the phrase extraction (e.g., n-grams of order 10 or higher).

In some implementations, receiving the collection of phrases includes receiving the collection of phrases from a remote location as previously generated using a particular phrase extraction technique. In other implementations, receiving the collection of phrases includes locally generated the collection from a collection of text.

The system identifies 104 candidate non-compositional compounds ("NCC's") from the collection of phrases. Identifying candidate NCC's can include filtering the collection of phrases to identify phrases that are likely to be compounds. For example, single word phrases can be ignored since they are not compounds. Additionally, a phrase length limit can be applied to identify likely compounds. For example, it may be unlikely for any phrases having five or more words to be a compound. Therefore, long phrases can also be ignored when identifying candidate NCC's. Additionally, rare phrases can also be ignored. For example, the collection of phrases can include a frequency count for each phrase identifying how many times the phrases occurred in a collection of text. The phrases that appear less than a specified number of times (e.g., less than 100 times) can be ignored.

The system determines 105 whether each candidate NCC is an NCC. Each candidate NCC can be processed serially or in parallel. For clarity, the actions for determining whether candidate NCC's are NCC's is described below with respect to a single candidate NCC.

For each candidate NCC, the system identifies 106 similar words to the constituent words of the candidate NCC. There are different types of similarity. For example, synonyms of words describe one kind of similarity. Another type of similarity relates to words belonging to the same category or categories of a word. This is also referred to as vertical similarity. Alternatively, a third type of similarity relates to words being similar to a given word based on the circumstances in which those words occur together (e.g., frequent co-occurrence of words).

Figure 2:
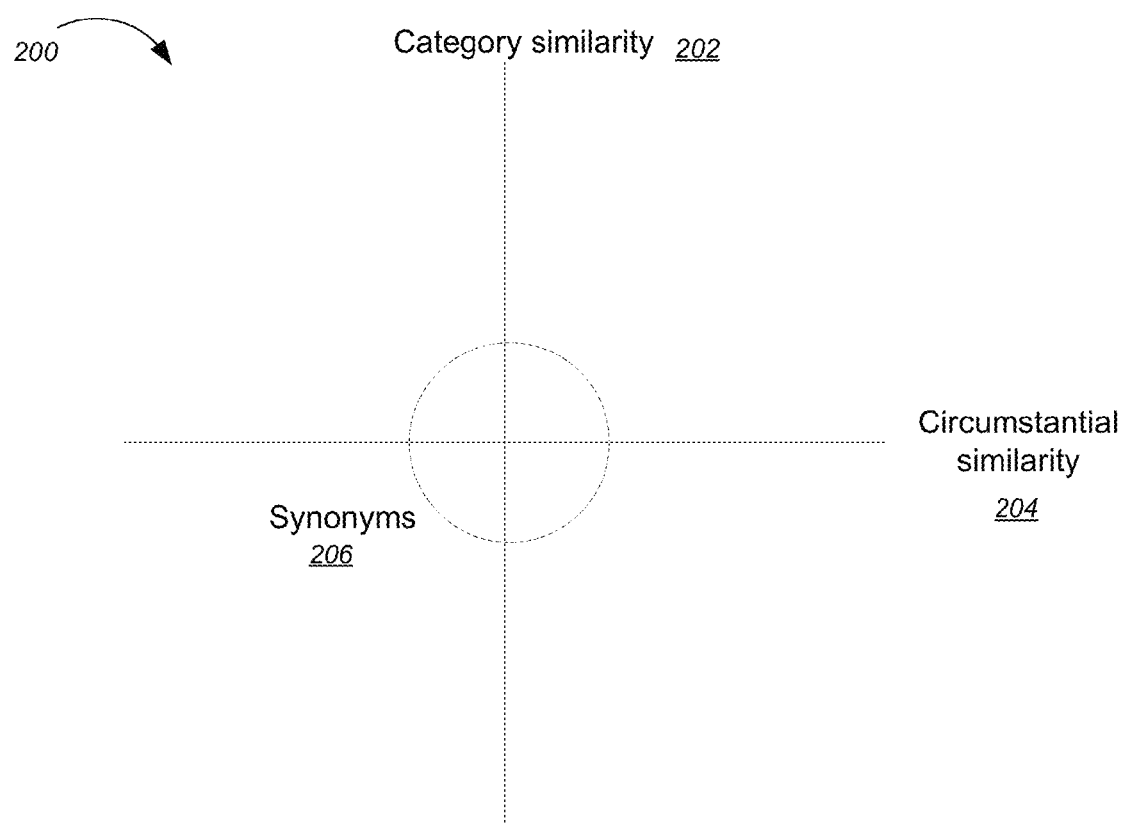
FIG. 2 is a diagram illustrating example similarity types.

FIG. 2 is a diagram 200 illustrating the different similarity types. Diagram 200 includes different similarity axes. In particular, a vertical axis 202 represents vertical or category similarity. A horizontal axis 204 represents horizontal or circumstantial similarity. Circle 206 represents synonyms. For example, for a word "Mercedes-Benz," words having vertical similarity can include "BMW" and "Lexus". For the same word, horizontally similar words may include "dealership" and "AMG". Additionally, synonyms could include "Benz" and "MB". There may be overlap between the similarity types such that a given word may belong to more than one similarity type.

While all types of similarity can optionally be used, the similarity measures described below are designed to identify words that have a vertical similarity or are synonyms without identifying words that are only circumstantially similar to a given candidate NCC word. A group of vertically similar phrases can provide the meaning of a particular phrase. Thus, phrases with a high vertical similarity likely have the same or similar meaning.

In particular, identifying similar words to the words in a candidate NCC includes identifying a context of the words within a collection of text. The collection of text can be the same collection used to extract the phrases or can be a different collection. Words that have contexts identified as similar, as described in detail with respect to FIG. 3 below, indicate vertical similarity between the words.

Figure 3:
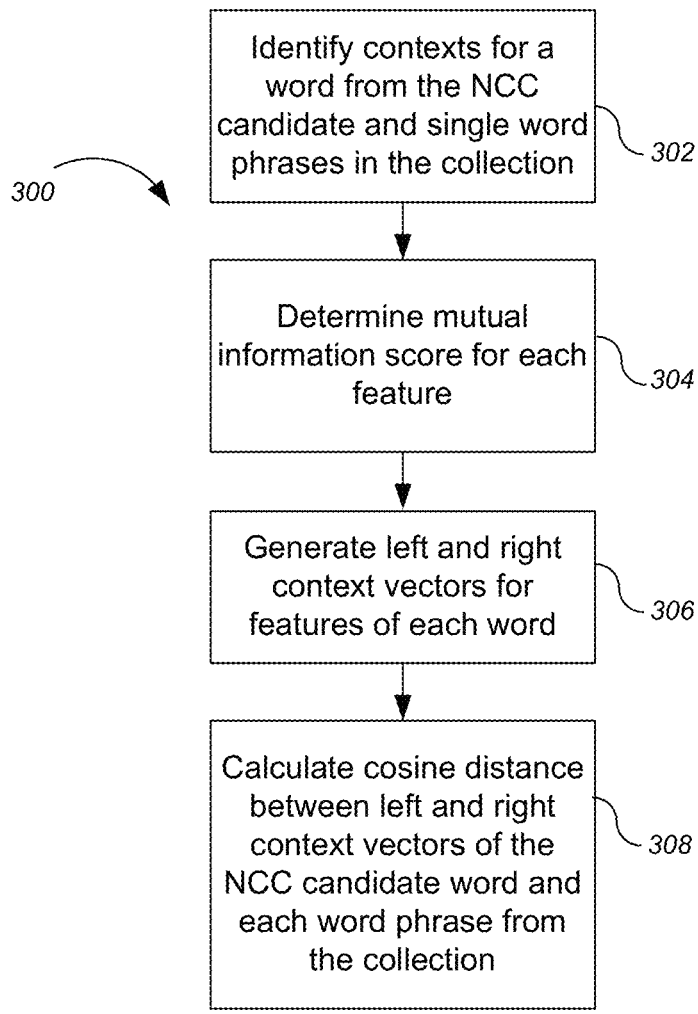
FIG. 3 is a flowchart showing an example method for determining similar words to a candidate NCC word.

FIG. 3 is a flowchart of an example method 300 for determining similar words to a candidate NCC word. For convenience, the method 300 will be described with respect to a system that performs the method 300.

The system identifies 302 a context for the candidate NCC word and for each single word phrase in the collection of phrases. The context is obtained from a collection of text. The context includes both a left context and a right context. The left context corresponds to one or more features occurring immediately to the left of the word in the collection of text. The right context corresponds to one or more features occurring immediately to the right of the word in the collection of text. For example, the collection of text can include a number of unique sentences that include a particular word but with each having a different context. Similarly, a number of sentences in the collection of text can include the same context for the candidate NCC word or for other word phrases.

Features are a collection of high count n-grams derived from a feature collection. The feature collection can be the same collection of text or a different collection of text from the collection of text used to extract phrases including the candidate NCC's. For example, n-gram counts can be calculated for a feature collection of web documents and search queries. A group of the highest count n-grams can be identified as features.

For example, in some implementations, the system identifies the top 300,000 most frequently occurring n-grams in the feature collection as features. In some implementations, stop words are filtered out. Stop words are words that appear with the highest frequency in a large collection of text but carry little or no meaning, for example, "is", "a", "the".

In some implementations, the features include an identification of a beginning or an end of a sentence. Thus, the candidate NCC word or the word phrases from the collection of phrases can occur at the beginning or end of an entry in the collection of text (e.g., a sentence from a web document)

where the left context is the sentence beginning or the right context is the sentence end, respectively.

For example, for the phrase candidate "hot dog" in the text entry "bought a hot dog at the game" the left context of the string is "bought" and the right context is "game" (assuming that "bought" and "game" are identified features). In the example sentence, the words "a" and "at the" are not features, but instead are stop words. Consequently, the nearest feature to the right of "hot dog" is "game". In some implementations, only one feature on each side of the candidate NCC word is identified. However, features can be a phrase having more than one word.

A given candidate NCC word or single word phrase from the collection of phrases occurring in multiple entries in the collection of text can have a number of different left and right contexts. For example, other left contexts to the candidate NCC word "hot" can include "running" and "red" while other right contexts to the candidate NCC word "hot" can include "dog" and "sauce".

The system calculates 304 a score for each feature identified as a context for the candidate NCC word and each single word phrase from the collection of phrases. For example, the system can calculate a mutual information score to provide a measure of the relationship strength between the feature and each respective word (e.g., the strength of the relationship between "hot" and "sauce").

In some implementations, the system calculates the mutual information score as a function of the probability that the feature occurs together with the word and the probabilities that the word and feature occur individually in the collection of text. In particular, the mutual information score of a feature in the left context can be written as:

$$M = \log\left(\frac{\#(\text{left context word})}{(\#\text{ left context})(\#\text{ word})}\right).$$

Thus, the mutual information score for the feature "red" as the left context of the candidate NCC word "hot" is:

$$M = \log\left(\frac{\#\text{ red hot}}{(\#\text{ red})(\#\text{ hot})}\right),$$

where # red hot is the probability that "red hot" occurs in the collection of text, # red is the probability that "red" occurs in the collection of text, and # hot is the probability that "hot" occurs in the collection of text. Probability is calculated as the frequency that a word occurs divided by the total frequency of all word occurrences.

In some implementations, the system uses an intervening stop word in the mutual information score. For example, if the text is "pass the hot sauce", the stop word "the" is between the candidate NCC word "hot" and the left context feature "pass". The system can apply a portion of the frequency to the stop word and a portion of the frequency to the feature (e.g., half to each) when calculating mutual information score. Thus, the strength of a particular relationship between a word and a feature can be influenced by the presence of intervening stop words.

The system generates 306 left and right context vectors for the identified features of the candidate NCC word and each of the single word phrases. The left context vector includes mutual information scores for features occurring as the left context of the particular word. Similarly, the right context vector includes mutual information scores for features occurring as the right context of the particular word. Thus, each word (e.g., the candidate NCC word and the single word phrases) have two associated context vectors. Each context vector can include mutual information scores for a large number of features. For example, in some implementations, each vector includes up to 2000 features. Using the above example, the left context vector for the phrase candidate "hot" is:

<[running] 6.962552, [red] 7.432347, . . . >

Similarly, the right context vector for the phrase candidate "hot" is:

<[dog] 8.145269, [sauce] 5.9232, . . . >

The system calculates 308 a cosine distance between the left and right context vectors of the candidate NCC word and each of the singe word phrases to determine a similarity score between each respective pair of candidate NCC word and word phrase. For example, when determining the similarity between the candidate NCC word "hot" and the single word phrase "sexy" the cosine distance is calculated for the left and right context vector pairs calculated for each.

The cosine distance represents the angular distance between two vectors. For example, for two vectors <a, b, c> and <x, y, z>, the cosine distance is provided by:

$$\text{cosdist}(\langle a, b, c \rangle, \langle x, y, z \rangle) = 1 - \frac{ax + by + cz}{\sqrt{a^2 + b^2 + c^2}\sqrt{x^2 + y^2 + z^2}}.$$

The higher the cosine distance (range from 0 to 1) the greater the similarity between the two vectors, and therefore the similarity between the two words. For example, the cosine distance for the two left context vectors of "hot" and "sexy" can be 0.127 and the cosine distance between the two right context vectors can be 0.129.

In some implementations, when determining the similarity between an NCC candidate word and a particular single word phrase, the lower of the two cosine distance values is used, e.g., 0.127, as the similarity value for the pair of words. In other implementations, the system averages the two values or otherwise manipulates them to calculate a similarity value for the pair of words. Thus, the system calculates a similarity value for each single word phrase relative to each candidate NCC word in each candidate NCC.

In some alternative implementations, a different measure of similarity between NCC candidate words and single word phrases is calculated. For example, other techniques for calculating a distance between vectors can be used, e.g., a Bray-Curtis distance measure.

Once similar words are identified, they can be filtered by a specified similarity threshold in order to reduce the number of similar words for a given NCC candidate word. Alternatively, top k similar words can be used for each word in the NCC candidate.

As shown in FIG. 1, the system substitutes 108 the words of the candidate NCC with the identified similar words, individually or in combination, to generate substitute phrases. For example, for the candidate NCC "hot dog" the identified similar words for "dog" can include "horse", "cat", and "puppy". Therefore, the system substitutes each to generate the respective substitute phrases "hot horse", "hot cat", and "hot puppy". Similarly, the system substitutes similar words to "hot".

The system calculates 110 the similarity of each substitute phrase with the candidate NCC in a similar manner as calculating the similarity between words described above with respect to FIG. 3, but for candidate NCC's and substituted phrases.

Figure 4:
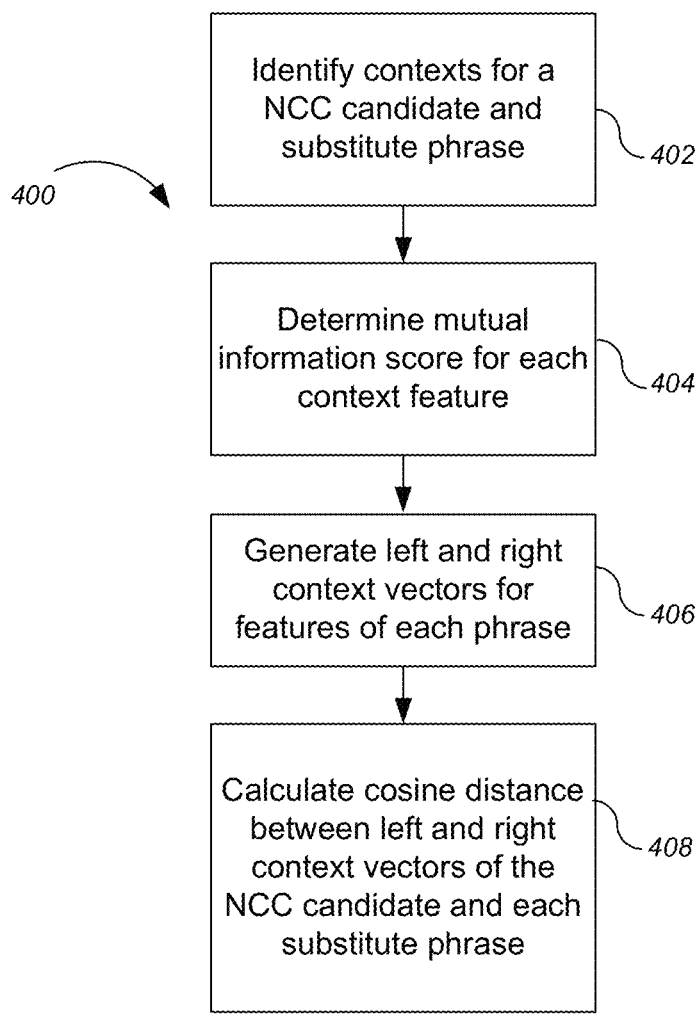
FIG. 4 is a flowchart showing an example method for measuring similarity between a candidate NCC and a substitute NCC.

FIG. 4 is a flowchart of an example method 400 for determining similarity between a candidate NCC and a substitute phrase. For convenience, the method 400 will be described with respect to a system that performs the method 400.

The system identifies 402 a context for both the candidate NCC and the substitute phrase. The context is obtained from a collection of text. The context includes both a left context and a right context. The left context corresponds to one or more features occurring immediately to the left of the phrase candidate in the collection of text. The right context corresponds to one or more features occurring immediately to the right of the candidate NCC and the substitute phrase in the collection of text. For example, the collection of text can include a number of unique sentences that include a particular phrase candidate but with each having a different context. Similarly, a number of sentences in the collection of text can include the same context for the NCC candidate or for the substitute phrase.

Features are a collection of high count n-grams derived from a feature collection. The feature collection can be the same collection of text or a different collection of text from the collection of text used to extract phrases including the candidate NCC's. For example, the system can calculate n-gram counts for a feature collection of web documents and search queries. A group of the highest count n-grams can be identified as features.

For example, in some implementations, the system identifies the top 300,000 most frequently occurring n-grams in the feature collection as features. In some implementations, the system filters out stop words. Stop words are words that appear with the highest frequency in a large collection of text but carry little or no meaning, for example, "is", "a", "the".

In some implementations, the features include an identification of a beginning or an end of a sentence. Thus, the NCC candidate or the substitute phrase can occur at the beginning or end of an entry in the collection of text (e.g., a sentence from a web document) where the left context is the sentence beginning or the right context is the sentence end, respectively.

For example, for the phrase candidate "hot dog" in the text entry "bought a hot dog at the game" the left context of the string is "bought" and the right context is "game". In the example sentence, the words "a" and "at the" are not features, but instead are stop words. Consequently, the nearest feature to the right of "hot dog" is "game".

A given candidate NCC or substitute phrase occurring in multiple entries in the collection of text can have a number of different left and right contexts. For example, other left contexts to the phrase candidate "hot dog" can include "sold" and "ate" while other right contexts to the phrase candidate "hot dog" can include "mustard" and "baseball".

The system calculates 404 a score for each feature identified as a context for the phrase candidate. For example, the system can calculate a mutual information score to provide a measure of the relationship strength between the feature and the phrase (e.g., candidate NCC's or substitute phrase). In some implementations, the system calculates the mutual information score as a function of the frequency that the feature occurs together with the phrase candidate and the frequencies that the phrase candidate and feature occur individually in the collection of text. In particular, the mutual information score of a feature in the left context can be written as:

$$M = \log\left(\frac{\#(\text{left context phrase candidate})}{(\#\text{ left context})(\#\text{ phrase candidate})}\right).$$

Thus, the mutual information score for the feature "bought" as the left context of the candidate NCC "hot dog" is:

$$M = \log\left(\frac{\#\text{ bought hot dog}}{(\#\text{ bought})(\#\text{ hot dog})}\right),$$

where # bought hot dog is the frequency that "bought hot dog" occurs in the corpus (minus stop words), # bought is the frequency that "bought" occurs in the corpus, and # hot dog is the frequency that "hot dog" occurs in the collection of text.

In some implementations, the system uses an intervening stop word in the mutual information score. For example, in the above example sentence, the stop words "at the" are between the candidate NCC "hot dog" and the right context feature "game". The system can apply a portion of the mutual information score to the stop word and a portion of the mutual information score to the feature (e.g., half to each). Thus, the strength of a particular relationship between a phrase and a feature can be influenced by the presence of intervening stop words.

The system generates 406 left and right context vectors for the identified features of the NCC candidate and the substitute phrase. The left context vector includes mutual information scores for features occurring as the left context of the particular phrase. Similarly, the right context vector includes mutual information scores for features occurring as the right context of the particular phrase. Thus, each phrase (e.g., the NCC candidate and the substitute phrase) has two associated context vectors. Each context vector can include mutual information scores for a large number of features. For example, in some implementations, each vector includes up to 2000 features. Using the above example, the left context vector for the phrase candidate "hot dog" is:
<[bought] 6.962552, [ate] 7.432347, [sold] 8.339796, . . . >
Similarly, the right context vector for the phrase candidate "hot dog" is:
<[mustard] 8.145269, [baseball] 5.9232, . . . >

The system calculates 408 a cosine distance between the left and right context vectors of the NCC candidate phrase and the substitute phrase to determine a similarity between the pair. For example, when determining the similarity between the NCC candidate "hot dog" and the substitute phrase "sexy dog" the cosine distance is calculated for the left and right context vector pairs of each. The higher the cosine distance (range from 0 to 1) the greater the similarity between the two vectors and therefore the greater similarity between the NCC candidate phrase and the substitute phrase. For example, the cosine distance for the two left context vectors of "hot dog" and "sexy dog" can be 0.0012 and the cosine distance between the two right context vectors can be 0.0034.

In some implementations, when determining the similarity between an NCC candidate and a substitute phrase, the lower of the two cosine distance values is used, e.g., 0.15. In other implementations, the system averages the two values or otherwise manipulates them to calculate a similarity value for the pair of words. Thus, the system calculates a similarity value for each substitute phrase relative to each candidate NCC's In some alternative implementations, as with similar words, a different measure of similarity between NCC candidates and substitute phrase is calculated. For example, other techniques for calculating a distance between vectors can be used, e.g., a BrayCurtis distance measure.

As shown in FIG. 1, the system compares 112 the similarity value of the substitute phrases with a specified threshold value. The system can determine the threshold value empirically, for example based on test data identifying threshold values that substantially identify all NCC's while avoiding false positive results classifying compositional compounds as NCC's.

The system identifies 114 the candidate NCC as a non-compositional compound if similarity is less than threshold value. When the similarity value of the substitute phrases is less than the specified threshold value, the phrase is identified as a non-compositional compound. Otherwise, the candidate NCC is identified as a compositional compound. In some implementations, all candidates NCC's that are not identified as NCC's are considered compositional compounds even though some of those may be partial compositional compounds. In some implementations, if the similarity of any substituted phrase exceeds the threshold, the candidate NCC is identified as a compositional compound.

Figure 5:
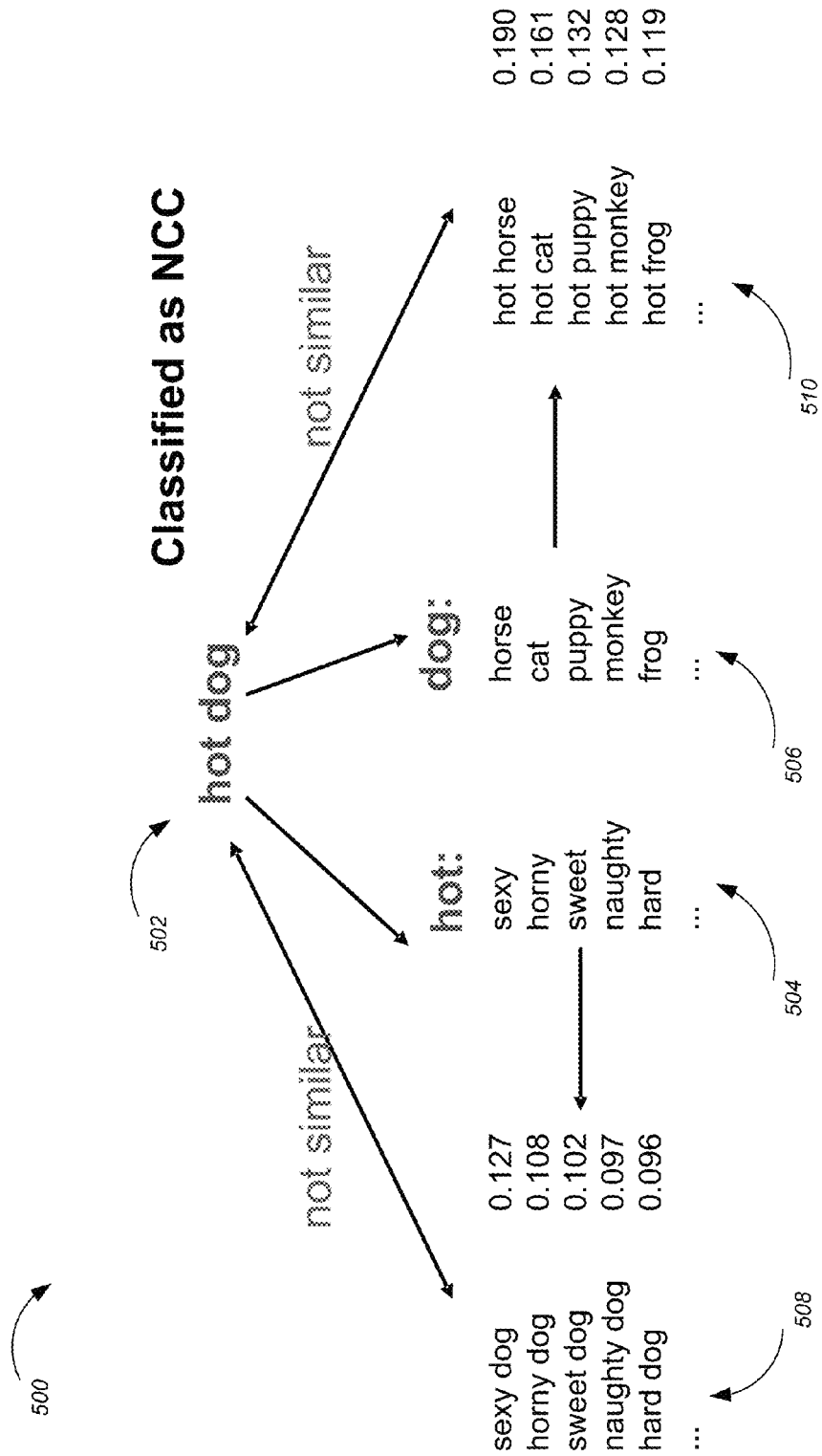
FIG. 5 is a diagram showing example similarity values for similar phrases of a non-compositional compound.

For example, FIG. 5 is a diagram 500 showing example similarity values for similar phrases of a non-compositional compound. FIG. 5 shows an example candidate NCC 502 "hot dog" along with a list of similar words identified for both "hot" and "dog". In particular, similar words 504 to "hot" include "sexy", "sweet", and "naughty". Similarly, similar words 506 to "dog" include "horse", "cat", and "puppy". Each of these are substituted to form substitute phrases 508 and 510, respectively. For example, the substitute phrases generated from "dog" include "hot horse", "hot cat" and "hot puppy".

For each of these substitute phrases, a similarity value calculated for the respective substitute phrase and the candidate NCC is shown. For example, the similarity value between the NCC candidate "hot dog" and the substitute phrase "hot horse" is 0.190. In particular, the similarity values for all of the substitute phrases are low. For example, if the specified similarity threshold value is 0.3, each of the substitute phrases has a similarity value less than the threshold. Consequently, "hot dog" is identified as a NCC since none of the substitute phrases have a similarity to the candidate NCC that exceeds the specified threshold.

Figure 6:
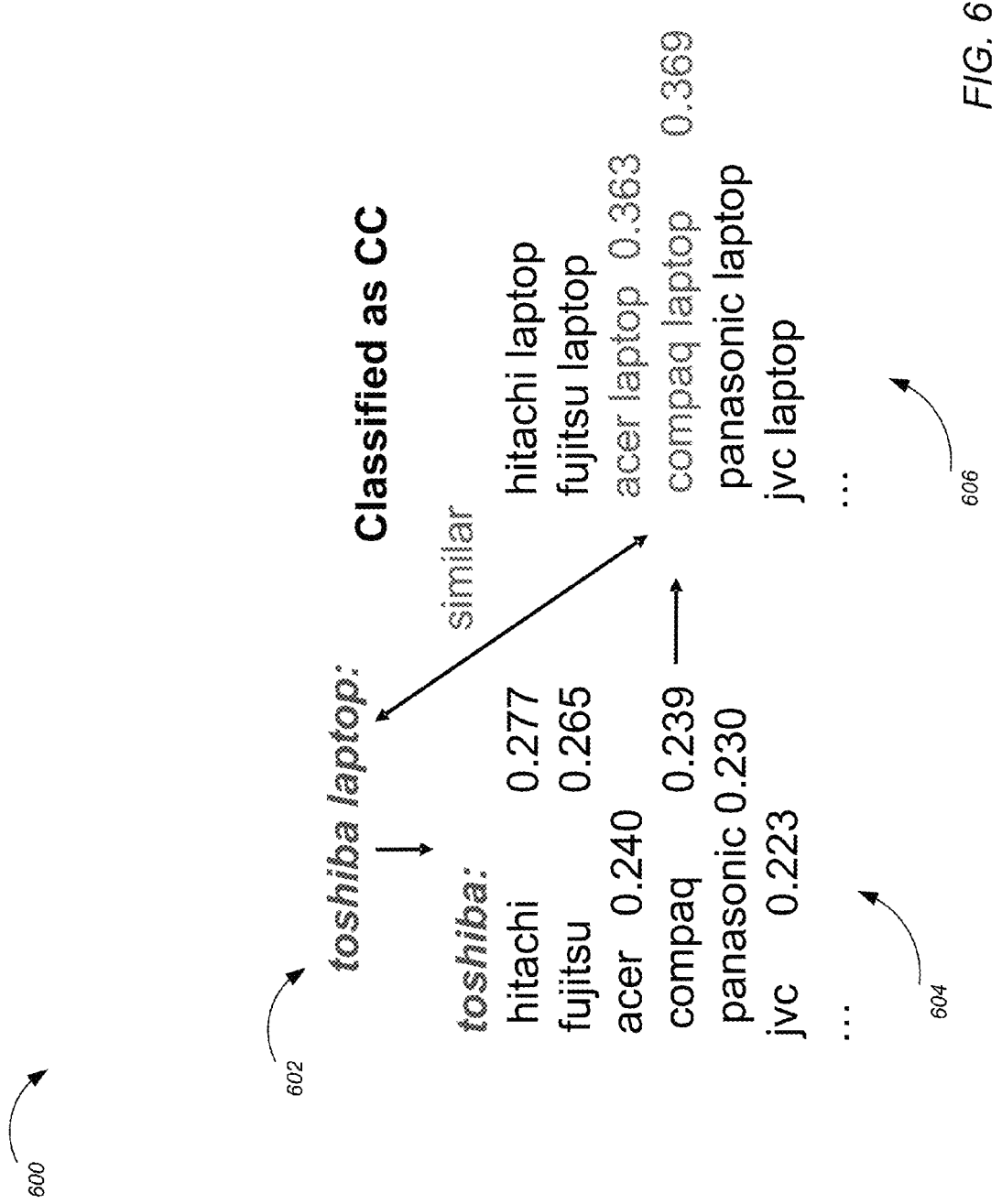
FIG. 6 shows a diagram showing example similarity values for similar phrases of a compositional compound.

Similarly, FIG. 6 shows a diagram 600 showing example similarity values for similar phrases of a compositional compound. In particular FIG. 6 shows a candidate NCC "toshiba laptop" 602. For the term "toshiba" a group of similar words 604 to "toshiba" are shown, including "hitachi", "fujitsu", "acer", and "compaq". Each of these has an associated similarity score identifying the similarity of the words with "toshiba". For example, the similar word "hitachi" has a similarity score of 0.277 relative to "toshiba". Each of these similar words are substituted, for example to form "toshiba laptop" for "toshiba" to obtain substitute phrases 606 including "hitachi laptop", "fujitsu laptop", "acer laptop", and "compaq laptop". Similar words to "laptop" can also be identified in a similar manner, but are not shown in FIG. 6.

Similarity values are calculated for each substitute phrase relative to "toshiba laptop" 606. In particular, FIG. 6 shows that the similarity values between "toshiba laptop" and "acer laptop" and "compaq laptop" as 0.363 and 0.369, respectively. For a threshold similarity value of 0.3, both "acer laptop" and "compaq laptop" exceed the specified threshold value. As a result, the "toshiba laptop" is classified as not being an NCC, and therefore is identified as a compositional compound.

Thus, as illustrated by FIGS. 5 and 6, words that have a high similarity to a candidate NCC word can result in a substitute phrase with a high or low similarity. Since NCC's have a different meaning than the constituent words, the substitute phrases generated from words similar (e.g., vertically similar) to the consentient words are not similar to the NCC. By contrast, compositional compounds include constituent words that retain their meaning in the compound. Thus, substitute phrases generated from similar words should still be similar to the compositional compound.

As shown in FIG. 1, the system annotates the identified NCC's. For example, metadata can be associated with the NCC's in a database so that the NCC's can be identified for other operations, e.g., information retrieval. In particular, the search can be modified for a query including an NCC. For example, for a search query "hot dog" using typical information retrieval techniques would search for relevant documents including not only "hot dog" but also "hot" and "dog" individually. However, since "hot dog" is an NCC, documents including only "hot" or "dog" are unlikely to be relevant to the query.

Since the phrase "hot dog" has been annotated as an NCC, the information retrieval process can use this information to modify the search for relevant documents responsive to the query. For example, string matching can be used to determine whether the input query matches an identified NCC. In some other implementations, Viterbi-decoding based segmentation is used to determine whether the input query includes an identified NCC. In particular, documents that only include "hot" or "dog" but not "hot dog" can be discarded or demoted since they are not likely to be relevant to the query. Alternatively, a weighting scheme can promote results identifying documents including "hot dog" over results identifying documents that include either term individually.

Alternatively, the identified NCC's can be used in selecting advertisements to present in response to input queries. In some implementations, query terms are used to identify one or more advertisements to present. Determining whether the query includes NCC's is used to match the query with the correct advertisements. In some other implementations, advertisements are presented in particular resources. The advertisements for a resource are presented based on content associated with particular the resource. For example, a mail application can present advertisements based in part on the content of one or more mail messages. In another example, the content of a Web page can be use to identify advertisements to present on Web page. The system can use the non-compositional compounds in the content of the resource to identify appropriate advertisements to present.

Figure 7:
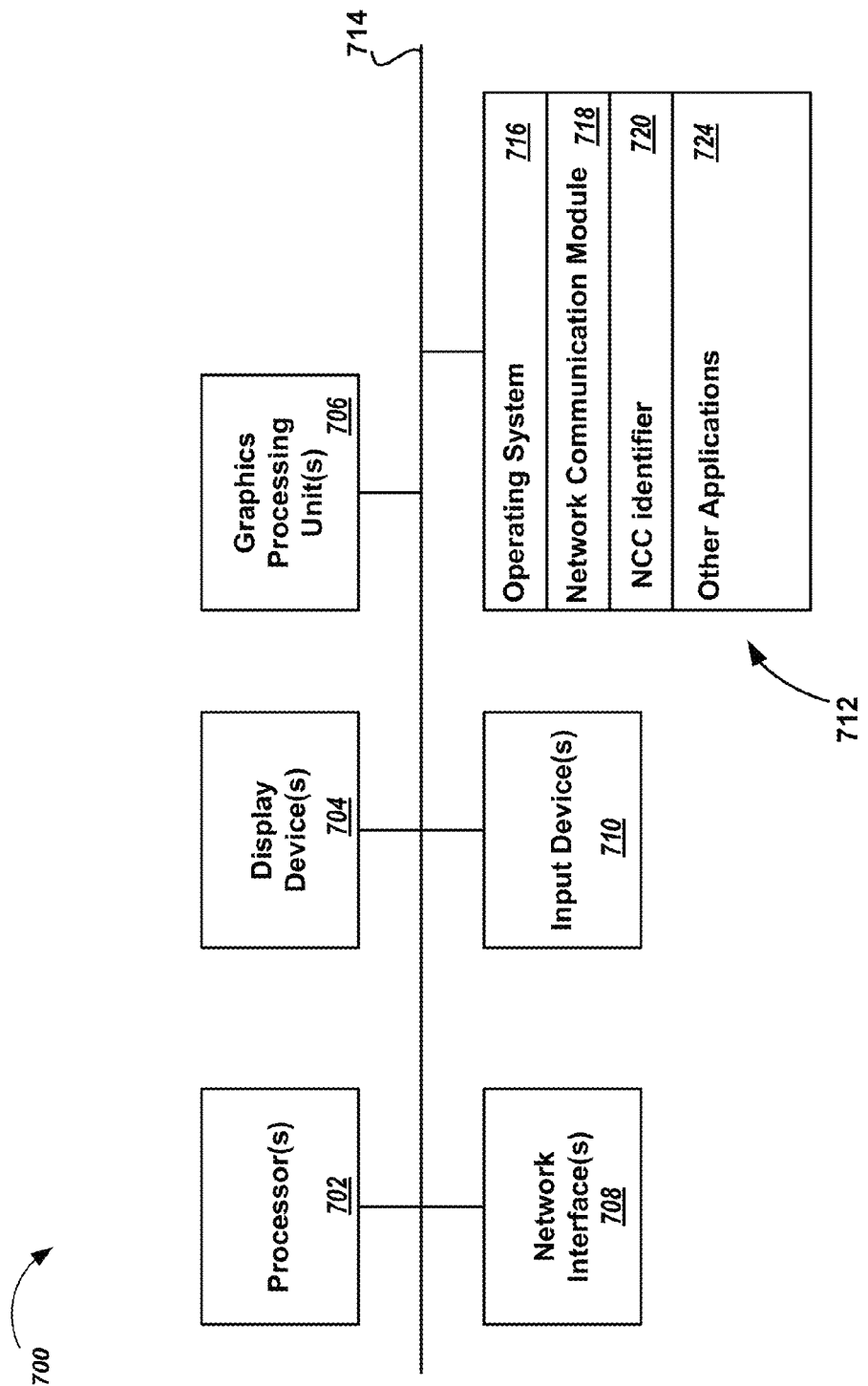
FIG. 7 illustrates an example architecture of a system.

FIG. 7 illustrates an example architecture of a system 700. The system architecture 700 is capable of performing operations for identifying non-compositional compounds. The architecture 700 includes one or more processors 702 (e.g., IBM PowerPC, Intel Pentium 4, etc.), one or more display devices 704 (e.g., CRT, LCD), graphics processing units 706 (e.g., NVIDIA GeForce, etc.), a network interface 708 (e.g., Ethernet, FireWire, USB, etc.), input devices 710 (e.g., keyboard, mouse, etc.), and one or more computer-readable mediums 712. These components exchange communications and data using one or more buses 714 (e.g., EISA, PCI, PCI Express, etc.).

The term "computer-readable medium" refers to any medium that participates in providing instructions to a processor 702 for execution. The computer-readable medium 712 further includes an operating system 716 (e.g., Mac OS®, Windows®, Linux, etc.), a network communication module 718, an NCC identifier 722, and other applications 724.

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, etc.); and managing traffic on the one or more buses 714. The network communications module 718 includes various components for establishing and maintaining network connections (e.g., software for implementing communication protocols, such as TCP/IP, HTTP, Ethernet, etc.).

The NCC identifier 720 provides various software components for performing the various functions for identifying non-compositional compounds from NCC phrase candidate, as described with respect to FIGS. 1-4 including receiving phrases, identifying NCC candidates, calculating similarity measures, and determining whether a given NCC candidate is a NCC based on the similarity measures. Identified NCC's can be annotated and stored as such on the computer-readable medium 712 for future use (e.g., to identify NCC's in information retrieval operations) or transmitted to another location using network interface 708.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a collection of phrases from a collection of text, each phrase including two or more words; and
    for each phrase, determining if the phrase is a non-compositional compound, a non-compositional compound being a phrase of two or more words where the words composing the phrase have different meanings in a compound than their conventional meanings individually, the determining including:
        identifying a similar word for a word of the phrase,
        substituting the similar word for the word of the phrase to generate a substitute phrase,
        calculating a similarity between the phrase and the substitute phrase, including performing a similarity measure based on a context of the phrase and the substitute phrase, respectively, in the collection of text, and
        identifying the phrase as a non-compositional compound based on a comparison of the calculated similarity with a specified threshold.

2. The method of claim 1, wherein the similarity identifies a category similarity.

3. The method of claim 1, further comprising annotating phrases identified as non-compositional compounds.

4. The method of claim 1, further comprising:
    receiving a search query;
    determining whether the search query includes a non-compositional compound; and
    modifying a search for resources responsive to the search query when the search query includes a non-compositional compound; and
    presenting search results in response to the modified search.

5. The method of claim 4, wherein the modifying includes searching for the non-compositional compound and not constituent terms of the non-compositional phrase.

6. The method of claim 1, further comprising:
    receiving a search query;
    determining whether the search query includes a non-compositional compound;
    using the non-compositional compound to identify one or more advertisements; and
    presenting search results responsive to the search query and the one or more advertisements.

7. A method comprising:
    receiving a collection of phrases from a collection of text, each phrase including two or more words;
    for each phrase, determining if the phrase is a non-compositional compound, the determining including:
        identifying a similar word for a word of the phrase,
        substituting the similar word for the word of the phrase to generate a substitute phrase,
        calculating a similarity between the phrase and the substitute phrase, and
        identifying the phrase as a non-compositional compound based on a comparison of the calculated similarity with a specified threshold; and
    annotating each phrase that is identified as a non-compositional compound.

8. The method of claim 7, wherein a non-compositional compound is a phrase of two or more words where the words composing the phrase have different meanings in a compound than their conventional meanings individually.

9. The method of claim 7, wherein identifying similar words to a non-compositional compound word includes performing a similarity measure based on the context of a candidate word and the context of other words from a collection of text.

10. The method of claim 7, wherein calculating similarity between candidate non-compositional compound and substitute phrase includes performing a similarity measure based on the context of the candidate non-compositional compound and the context of the substitute phrase from a collection of text.

11. The method of claim 7, wherein receiving phrases comprises:
 receiving a collection of text; and
 extracting phrases from the collection of text.

12. The method of claim 7, wherein the similarity is a vertical similarity.

13. The method of claim 12, wherein the vertical similarity refers to a category similarity.

14. The method of claim 7, wherein the similarity is a horizontal similarity.

15. The method of claim 14, wherein the horizontal similarity is based on circumstances in which the phrase and the substitute phrase occur together.

16. The method of claim 7, further comprising:
 receiving a search query;
 determining whether the search query includes a non-compositional compound; and
 modifying a search for resources responsive to the search query when the search query includes a non-compositional compound; and
 presenting search results responsive to the search query.

17. The method of claim 16, wherein the modifying includes searching for the non-compositional compound and not constituent terms of the non-compositional phrase.

18. The method of claim 7, further comprising:
 receiving a search query;
 determining whether the search query includes a non-compositional compound;
 using the non-compositional compound to identify one or more advertisements; and
 presenting search results responsive to the search query and the one or more advertisements.

19. A method comprising:
 receiving a collection of phrases from a collection of text, each phrase including two or more words;
 for each phrase, determining if the phrase is a non-compositional compound, the determining including:
  identifying a similar word for a word of the phrase,
  substituting the similar word for the word of the phrase to generate a substitute phrase,
  calculating a similarity between the phrase and the substitute phrase, including performing a similarity measure based on a context of the phrase and the substitute phrase, respectively, in the collection of text, and
  identifying the phrase as a non-compositional compound based on a comparison of the calculated similarity with a specified threshold; and
 annotating each phrase that is identified as a non-compositional compound.

* * * * *